us008945671B2

(12) United States Patent
Leininger et al.

(10) Patent No.: US 8,945,671 B2
(45) Date of Patent: Feb. 3, 2015

(54) METHOD FOR PRODUCING ENCAPSULATED SODIUM PERCARBONATE PARTICLES

(75) Inventors: Stefan Leininger, Langenselbold (DE); Michael Scheibe, Rheinfelden (DE); Harald Jakob, Hasselroth (DE)

(73) Assignee: Evonik Treibacher GmbH, Althofen (AT)

( * ) Notice: Subject to any disclaimer, the term of this patent is extended or adjusted under 35 U.S.C. 154(b) by 877 days.

(21) Appl. No.: 12/747,918

(22) PCT Filed: Nov. 20, 2008

(86) PCT No.: PCT/EP2008/065920
§ 371 (c)(1),
(2), (4) Date: Jun. 13, 2010

(87) PCT Pub. No.: WO2009/077289
PCT Pub. Date: Jun. 25, 2009

(65) Prior Publication Data
US 2010/0266763 A1    Oct. 21, 2010

(30) Foreign Application Priority Data
Dec. 19, 2007   (EP) .................................. 07123598

(51) Int. Cl.
| B05D 7/00 | (2006.01) |
| B05D 5/00 | (2006.01) |
| C11D 3/39 | (2006.01) |
| C01D 5/00 | (2006.01) |
| C01D 7/00 | (2006.01) |
| C01D 7/38 | (2006.01) |
| C11D 17/00 | (2006.01) |

(52) U.S. Cl.
CPC ............... *C11D 3/3942* (2013.01); *C01D 5/00* (2013.01); *C01D 7/00* (2013.01); *C01D 7/38* (2013.01); *C11D 17/0039* (2013.01)
USPC ......................................... 427/213; 427/345

(58) Field of Classification Search
CPC ... C11D 17/0039; C11D 3/3935; C11D 17/06
USPC .................................................. 427/345, 213
See application file for complete search history.

(56) References Cited

U.S. PATENT DOCUMENTS

| 4,105,827 A | 8/1978 | Brichard et al. |
| 4,135,010 A | 1/1979 | Klebe et al. |
| 4,146,571 A | 3/1979 | Will et al. |
| 4,156,039 A | 5/1979 | Klebe et al. |
| 4,325,933 A | 4/1982 | Matsumoto et al. |
| 4,329,244 A | 5/1982 | Brichard et al. |
| 4,428,914 A | 1/1984 | Brichard et al. |
| 4,526,698 A | 7/1985 | Kuroda et al. |
| 5,332,518 A | 7/1994 | Kuroda et al. |
| 5,458,801 A | 10/1995 | Oyashiki et al. |
| 5,462,804 A * | 10/1995 | Kokubu et al. ............ 428/402.24 |
| 5,560,896 A | 10/1996 | Bewersdorf et al. |
| 5,851,420 A | 12/1998 | Kim et al. |
| 5,906,660 A | 5/1999 | Pardini et al. |
| 5,935,708 A | 8/1999 | Schuette et al. |
| 6,022,404 A | 2/2000 | Ettlinger et al. |
| 6,113,805 A | 9/2000 | Schutte et al. |
| 6,159,252 A | 12/2000 | Schutte et al. |
| 6,165,963 A | 12/2000 | Delroisse et al. |
| 6,239,095 B1 | 5/2001 | Bertsch-Frank et al. |
| 6,245,115 B1 | 6/2001 | Appel et al. |
| 6,267,934 B1 | 7/2001 | Pardini et al. |
| 6,387,861 B1 | 5/2002 | Van Asperen et al. |
| 6,465,408 B1 | 10/2002 | Lee et al. |
| 6,583,098 B1 | 6/2003 | Cassie |
| 6,800,775 B1 | 10/2004 | Bachmann et al. |
| 6,900,169 B2 | 5/2005 | Wasserman et al. |
| 7,588,697 B2 | 9/2009 | Zimmermann et al. |
| 7,718,592 B2 | 5/2010 | Zimmermann et al. |
| 7,956,027 B2 | 6/2011 | Leininger et al. |
| 8,153,576 B2 | 4/2012 | Leininger et al. |
| 8,658,590 B2 | 2/2014 | Leininger et al. |
| 2002/0041843 A1 | 4/2002 | Jakob et al. |
| 2002/0086807 A1 | 7/2002 | Lee et al. |
| 2003/0031786 A1 | 2/2003 | Rumpler et al. |
| 2003/0104967 A1 | 6/2003 | Jakob et al. |
| 2006/0014658 A1 | 1/2006 | Zimmermann et al. |
| 2006/0063693 A1 | 3/2006 | Jakob et al. |

(Continued)

FOREIGN PATENT DOCUMENTS

| AU | B-31754/95 | 4/1996 |
| CA | 2170599 A1 | 3/1995 |

(Continued)

OTHER PUBLICATIONS

Response to Office Action filed Oct. 18, 2010 for copending U.S. Appl. No. 12/320,393.

(Continued)

*Primary Examiner* — Timothy Meeks
*Assistant Examiner* — Ann Disarro
(74) *Attorney, Agent, or Firm* — Law Office of: Michael A. Sanzo, LLC

(57) ABSTRACT

A process for producing coated sodium percarbonate particles by spray application of a sodium sulfate-containing aqueous solution onto sodium percarbonate particles in a fluidized bed and simultaneous evaporation of water, wherein sodium sulfate and sodium percarbonate-containing dust is used to prepare the sodium sulfate-containing aqueous solution.

14 Claims, No Drawings

(56) References Cited

U.S. PATENT DOCUMENTS

| | | | |
|---|---|---|---|
| 2006/0148669 | A1 | 7/2006 | Ulrike Kottke et al. |
| 2006/0148670 | A1 | 7/2006 | Rabe et al. |
| 2006/0249707 | A1 | 11/2006 | Zimmermann et al. |
| 2007/0135323 | A1 | 6/2007 | Wiedemann et al. |
| 2007/0275243 | A1 | 11/2007 | Sontgerath et al. |
| 2008/0108538 | A1 | 5/2008 | Sontgerath et al. |
| 2008/0274937 | A1 | 11/2008 | Venbrux et al. |
| 2013/0059765 | A1 | 3/2013 | Leininger et al. |

FOREIGN PATENT DOCUMENTS

| | | | |
|---|---|---|---|
| DE | 2 417 572 | | 11/1974 |
| DE | 26 22 610 | | 12/1976 |
| DE | 27 44 574 | A1 | 4/1978 |
| DE | 27 12 139 | | 9/1978 |
| DE | 195 44 293 | A1 | 6/1997 |
| DE | 196 08 000 | | 9/1997 |
| DE | 103 20 196 | A1 | 7/2004 |
| EP | 0 651 053 | A1 | 5/1993 |
| EP | 0 544 490 | A1 | 6/1993 |
| EP | 0 567 140 | A1 | 10/1993 |
| EP | 0 703 190 | A1 | 3/1996 |
| EP | 0 722 992 | A1 | 7/1996 |
| EP | 0 737 738 | | 10/1996 |
| EP | 0 787 682 | A1 | 8/1997 |
| EP | 0 970 917 | A1 | 1/2000 |
| EP | 1 149 800 | A1 | 10/2001 |
| EP | 1 612 185 | A1 | 1/2006 |
| EP | 1 612 186 | A1 | 1/2006 |
| EP | 16121686 | * | 1/2006 |
| EP | 1 728 762 | A1 | 12/2006 |
| EP | 1 903 098 | | 3/2008 |
| GB | 1 466 799 | | 3/1977 |
| GB | 1 538 893 | | 1/1979 |
| GB | 2 123 044 | A | 1/1984 |
| GB | 2 309 976 | A | 8/1997 |
| WO | WO 95/06615 | | 3/1995 |
| WO | WO 95/15292 | | 6/1995 |
| WO | WO 97/19890 | | 6/1997 |
| WO | WO 99/64156 | | 12/1999 |
| WO | WO 00/12808 | | 3/2000 |
| WO | WO 00/27975 | | 5/2000 |
| WO | WO 00/52124 | | 9/2000 |
| WO | WO 00/60043 | | 10/2000 |
| WO | WO 00/71666 | | 11/2000 |
| WO | WO 01/05925 | A1 | 1/2001 |
| WO | WO 03/031045 | A1 | 4/2003 |
| WO | WO 2004/039932 | A1 | 5/2004 |
| WO | WO 2004/056954 | A1 | 7/2004 |
| WO | WO 2004/058640 | A1 | 7/2004 |
| WO | WO 2006/003155 | | 1/2006 |
| WO | WO 2007/127641 | | 11/2007 |
| WO | WO 2008/135464 | A1 | 11/2008 |
| WO | WO 2011/134972 | | 11/2011 |

OTHER PUBLICATIONS

Office Action dated Oct. 27, 2010 for copending U.S. Appl. No. 12/310,817.
Notice of Allowance dated Nov. 11, 2010 for copending U.S. Appl. No. 12/320,394.
Office Action dated Nov. 17, 2010 for copending U.S. Appl. No. 12/320,393.
Response to Office Action dated Oct. 27, 2010 for copending U.S. Appl. No. 12/310,817, (Response filed on Jan. 25, 2011).
Response to Office Action dated Nov. 17, 2010 for copending U.S. Appl. No. 12/320,393, (Response filed on Feb. 4, 2011).
Examiner's Answer mailed Jul. 12, 2011 for copending U.S. Appl. No. 12/310,817.
Response to Office Action filed Mar. 23, 2011 for copending U.S. Appl. No. 12/320,393.
Species Election Requirement mailed Jul. 11, 2011 for copending U.S. Appl. No. 12/442,865.
Response to Species Election Requirement filed Aug. 6, 2011 for copending U.S. Appl. No. 12/442,865.
Amendment filed Aug. 6, 2011 for copending U.S. Appl. No. 12/442,865.
English language translation of the Written Opinion of the International Searching Authority for PCT/EP2008/065920 filed Nov. 20, 2008.
Response to Office Action of Dec. 12, 2011 filed on Apr. 12,2012 for copending U.S. Appl. No. 12/442,865.
Final Rejection mailed Aug. 10, 2012 for copending U.S. Appl. No. 12/442,865.
Response to Final Rejection of Aug. 10, 2012 filed on Oct. 7, 2012 for copending U.S. Appl. No. 12/442,865.
Non-Final Rejection mailed Oct. 19, 2012 for copending U.S. Appl. No. 12/442,865.
Preliminary Amendment filed Oct. 24, 2012 for copending U.S. Appl. No. 13/643,174.
U.S. Appl. No. 13/643,174, filed Oct. 24, 2012, Leininger.
Advisory Action mailed Feb. 10, 2011 for copending U.S. Appl. No. 12/310,817.
Notice of Appeal filed on Feb. 27, 2011 for copending U.S. Appl. No. 12/310,817.
Appeal Brief filed on Apr. 21, 2011 for copending U.S. Appl. No. 12/310,817.
Office Action mailed Mar. 2, 2011 for copending U.S. Appl. No. 12/320,393.
Notice of Allowance dated Apr. 14, 2011 for copending U.S. Appl. No. 12/320,394.
Office Action mailed Dec. 12, 2011 for copending U.S. Appl. No. 12/442,865.
Reply Brief filed Sep. 6, 2011 for copending U.S. Appl. No. 12/310,817.
Notice of Allowance mailed Oct. 20, 2011 for copending U.S. Appl. No. 12/320,393.
English language translation of pp. 1/3-3/3 of an Opposition to counterpart European patent reference EP 2 080 544, filed with the European Patent Office on Sep. 1, 2011.
Non-final Office Action for co-pending U.S. Appl. No. 12/442,865, mailed Sep. 10, 2013.
Notice of Allowance for co-pending U.S. Appl. No. 12/310,817, mailed Sep. 30, 2013.
Opposition to counterpart European patent EP 2 080 544 filed with the European Patent Office on Sep. 1, 2011.
Winge, U., Master's Thesis: "Fluid-bed granulering," Lund University, published Nov. 2002 with English translation of p. 10; chapter 5; appendix 1 and appendix 2, cited as documents D1 and D1(a) in European Opposition to EP 080 544.
Patent Board Decision mailed May 23, 2013 for copending U.S. Appl. No. 12/310,817.
International Search Report for PCT/EP2008/065920 filed Nov. 20, 2008.
English language translation of the Written Opinion of the International Searching Authority for PCT/ EP2008/065920 filed Nov. 20, 2008.
English language translation of the Internation Preliminary Report on Patentability for PCT/EP2008/065920 filed Nov. 20, 2008.
Cole, et al., "Characterization of the Sodium Sulfate-Sodium Phosphate System," *J. Mol. Struct*. 643:101-107 (2002).
Eysel, et al., "Crystal Chemistry and Structure of $Na_2SO_4(I)$ and Its Solid Solutions," *Acta. Cryst*. B41:5-11 (1985).
Linnow, et al., "Investigation of Sodium Sulfate Transitions in a Porous Material Using Humidity- and Temperature-Controlled X-ray Diffraction," *Anal. Chem*. 78:4683-4689 (2006).
Reinhardt, et al., "Neue reaktive Bleichaktivatoren-eine Gratwanderung zwischen Bleicheffizienz und Farb-/Faserschädigung," *Tenside Surf. Det*. 34(6): 404-409 (1997).
Sakaguchi, et al., "The Phase-Transition Phenomenom in a Sodium Sulfate Crystal," *J. Electrochem. Soc*. 131:1942-1943 (1984).
Singhvi, et al., "Effect of Aliovalent Cation Doping on the Electrical Conductivity of $Na_2SO_4$: Role of Charge and Size of the Dopant," J. Solid State Chem. 138: 183-192 (1998).

(56) References Cited

OTHER PUBLICATIONS

Steiger, et al., "Crystallization of sodium sulfate phases in porous materials: The phase diagram $Na_2SO_4$—$H_2O$ and the generation of stress," *Geochimica et Cosmochimica Acta* 72:4291-4306 (2008).
English language translation of Khlapova, et al., "The Hexagonal Burkeite Solid Solution in the $Na_2SO_4$—$Na_2CO_3$ System," N.S. Kurnakov General and Inorganic Chemistry Institute, Academy of Science USSR. Translated from *Zhurnal Struturnoi Khimi* 4(4):569-575 (1963).
English language abstract for DE 27 12 139.
English language abstract for EP 0 703 190.
English language abstract for EP 0 787 682.
English language abstract for WO 95/06615.
English language abstract for WO 03/031045.
Office Action mailed Jul. 19, 2010 for copending U.S. Appl. No. 12/320,393.
Preliminary Amendment filed for U.S. Appl. No. 12/320,393 on Jan. 26, 2009.
Office Action mailed May 26, 2010 for copending U.S. Appl. No. 12/320,394.
Response to Office Action filed on Aug. 31, 2010 for copending U.S. Appl. No. 12/320,394.
Office Action mailed Jun. 8, 2010 for copending U.S. Appl. No. 12/310,817.
Response to Office Action filed on Sep. 8, 2010 for copending U.S. Appl. No. 12/310,817.
Preliminary Amendment filed for copending U.S. Appl. No. 12/442,865, on Mar. 25, 2009.
Response to Non-Final Office Action of Oct. 19, 2012 filed on Jan. 16, 2013 for copending U.S. Appl. No. 12/442,865.
Response to Office Action of Sep. 10, 2013 for co-pending U.S. Appl. No. 12/442,865, filed Dec. 7, 2013.
Final Office Action for co-pending U.S. Appl. No. 12/442,865, mailed Dec. 20, 2013.
Office Action for co-pending U.S. Appl. No. 13/643,174, mailed Sep. 16, 2014.
Response to Office Action of Sep. 16, 2014 for co-pending U.S. Appl. No. 13/643,174, filed Dec. 16, 2014.

\* cited by examiner

US 8,945,671 B2

METHOD FOR PRODUCING ENCAPSULATED SODIUM PERCARBONATE PARTICLES

CROSS REFERENCE TO RELATED APPLICATIONS

The present application is US national stage of international application, PCT/EP2008/065920 which had an international filing date of Nov. 20, 2008, and which was published in German under PCT Article 21(2) on Jun. 25, 2009. Priority is claimed to European application EP 07123598.0, filed on Dec. 19, 2007 which is hereby incorporated by reference in its entirety.

The invention provides a process for producing coated sodium percarbonate particles by spray application of a sodium sulfate-containing aqueous solution onto sodium percarbonate particles in a fluidized bed and simultaneous evaporation of water, wherein the sodium sulfate-containing aqueous solution is prepared using sodium sulfate and sodium percarbonate-containing dust.

Sodium percarbonate is increasingly being used as a bleaching constituent in detergents and cleaning compositions. For this application, sodium percarbonate must have sufficient storage stability in detergent and cleaning composition formulations, since there is otherwise undesired loss of active oxygen and hence of bleaching action in the course of storage of the detergents and cleaning compositions. Sodium percarbonate is moisture-sensitive and decomposes in detergent and cleaning composition formulations under the action of moisture with loss of active oxygen. To produce detergents or cleaning compositions, sodium percarbonate is therefore typically used in coated form, in which case the coating layer prevents the action of moisture on the coated sodium percarbonate particles.

DE 2 417 572 discloses the stabilization of sodium percarbonate by a coating composed of a mixed salt of sodium carbonate and sodium sulfate. The mixed salts have a molar ratio of sodium carbonate to sodium sulfate in the range from 0.3:1 to 3:1. The coating is applied by spray application of an aqueous solution of sodium carbonate and sodium sulfate onto sodium percarbonate particles and simultaneous evaporation of water. The spray application can be effected in a fluidized bed. The coating composed of a mixed salt of sodium carbonate and sodium sulfate achieves better stabilization than a coating consisting only of sodium carbonate or only of sodium sulfate.

WO 97/19890 discloses the stabilization of sodium percarbonate particles obtainable by fluidized bed granulation by means of a coating of sodium sulfate, which is applied by spray application of an aqueous solution of sodium sulfate to the sodium percarbonate particles in a fluidized bed and simultaneous evaporation of water. The use of sodium percarbonate obtainable by fluidized bed granulation achieves, with sodium sulfate alone, the same stabilizing effect as with a mixed salt of sodium carbonate and sodium sulfate. The sodium percarbonate particles coated with sodium sulfate have better silo storability compared to the particles coated with a mixed salt of sodium carbonate and sodium sulfate.

WO 2006/003155 describes coated sodium percarbonate particles with a mean particle size of 300 to 1600 μm and a coating layer which comprises small sodium percarbonate particles with a mean particle size of less than 100 μm. The particles are produced by applying a solution or suspension of a coating material in a mixer or in a fluidized bed to sodium percarbonate particles, in the course of which the small sodium percarbonate particles are supplied simultaneously and thus incorporated into the coating layer.

In the course of spray application of a solution of sodium sulfate in a fluidized bed, it is possible not only for sodium sulfate dust to form, but also for the abrasion of particles in the fluidized bed to form sodium percarbonate-containing dust which is discharged from the fluidized bed with the fluidizing gas. This sodium percarbonate-containing dust may contain from 50 to 80% by weight of sodium percarbonate, the rest being essentially sodium sulfate. Such a sodium percarbonate-containing dust does not meet the requirements for use in detergents.

In a similar manner, in the course of production of sodium percarbonate by buildup granulation from a sodium carbonate solution and aqueous hydrogen peroxide in a fluidized bed, sodium percarbonate-containing dust forms, which is discharged from the fluidized bed with the fluidizing gas. This sodium percarbonate-containing dust consists essentially of sodium percarbonate and may additionally also contain small amounts of additives which increase the stability of sodium percarbonate. This sodium percarbonate-containing dust too does not meet the requirements for use in detergents.

Finally, in the course of pneumatic delivery of sodium percarbonate particles, abrasion of the particles or fracture of particles may also form sodium percarbonate-containing dust which is not suitable for use in detergents.

It has now been found that such sodium percarbonate-containing dust can be used advantageously in combination with sodium sulfate for the coating of sodium percarbonate particles and can thus be recycled into a production process for sodium percarbonate particles for detergent and cleaning composition formulations.

The invention therefore provides a process for producing coated sodium percarbonate particles by spray application of a sodium sulfate-containing aqueous solution onto sodium percarbonate particles in a fluidized bed and simultaneous evaporation of water, in which the sodium sulfate-containing aqueous solution is prepared using sodium sulfate and sodium percarbonate-containing dust.

The sodium percarbonate particles used in the process according to the invention preferably consist essentially of sodium carbonate perhydrate of the composition 2 $Na_2CO_3.3H_2O_2$. They may additionally also contain small amounts of known stabilizers for peroxygen compounds, for example magnesium salts, silicates, phosphates and/or chelate complexing agents, such as phosphonates. The proportion of sodium percarbonate in the sodium percarbonate particles is preferably more than 80% by weight and more preferably more than 95% by weight. The proportion of organic carbon compounds is preferably less than 1% by weight, more preferably less than 0.1% by weight.

The sodium percarbonate particles used preferably contain small amounts of additives which have a stabilizing effect on the active oxygen content, the proportion of stabilizing additives preferably being less than 2% by weight. The stability-increasing additives used are preferably magnesium salts, water-glass, stannates, pyrophosphates, polyphosphates, polyacrylates, and chelate complexing agents from the group of the hydroxycarboxylic acids, aminocarboxylic acids, aminophosphonic acids, phosphonocarboxylic acids and hydroxyphosphonic acids, and the alkali metal, ammonium and magnesium salts thereof. In a particularly preferred embodiment, the sodium percarbonate particles contain, as a stabilizing additive, an alkali metal silicate, preferably water-glass with an $SiO_2/Na_2O$ modulus in the range from 1 to 3, in an amount of 0.1 to 1% by weight. In the most preferred embodiment, the sodium percarbonate particles contain, in addition to this amount of alkali metal silicate, also a magnesium compound in an amount of 50 to 2000 ppm of $Mg^{2+}$.

The sodium percarbonate particles used in the process according to the invention can be prepared by one of the known preparation processes for sodium percarbonate. A suitable preparation process for sodium percarbonate is the crystallization of sodium percarbonate from aqueous solutions of hydrogen peroxide and sodium carbonate, the crystallization being performable either in the presence or in the absence of a salt precipitant, on the subject of which reference is made by way of example to EP-A 0 703 190 and DE 2 744 574. Sodium percarbonate particles produced by the crystallization process in the presence of a salt precipitant may also contain small amounts of the salt precipitant used, for example sodium chloride. Likewise suitable is fluidized bed buildup granulation by spray application of aqueous hydrogen peroxide solution and aqueous sodium carbonate solution onto sodium percarbonate nuclei in a fluidized bed with simultaneous evaporation of water, reference being made by way of example to WO 95/06615. A further suitable preparation process is also the reaction of solid sodium carbonate with an aqueous hydrogen peroxide solution and subsequent drying.

In a preferred embodiment, the sodium percarbonate particles used are obtainable by buildup granulation from sodium carbonate and hydrogen peroxide in a fluidized bed. Such a buildup granulation in a fluidized bed affords sodium percarbonate particles which are distinguished from the sodium percarbonate particles obtained by other production processes by a particularly dense, shell-like structure and a smoother surface. Sodium percarbonate particles coated by the process according to the invention, the core of which has been produced by buildup granulation in a fluidized bed, exhibit improved storage stability in detergent and cleaning composition formulations compared to particles whose core has been produced by another process. Surprisingly, sodium percarbonate particles coated by the process according to the invention, the core of which has been produced by buildup granulation in a fluidized bed, also have a further-improved storage stability in detergent and cleaning composition formulations compared to particles whose core has been produced in the same way but which have been coated only with a solution of sodium sulfate.

In the process according to the invention, the sodium sulfate-containing aqueous solution is prepared using sodium sulfate and sodium percarbonate-containing dust. To prepare the solution, sodium sulfate can first be dissolved in water and the sodium percarbonate-containing dust can be dissolved in this solution. In a preferred alternative embodiment, sodium percarbonate-containing dust is separated from a gas stream in a scrubber and the aqueous solution obtained is used to prepare the sodium sulfate-containing aqueous solution. In this case, an aqueous scrubbing solution is preferably circulated in the scrubber, in which the sodium percarbonate-containing dust dissolves to release sodium carbonate and hydrogen peroxide. The scrubber can be operated such that the hydrogen peroxide released is decomposed to water and oxygen in the scrubbing solution.

In a preferred embodiment, the process according to the invention uses sodium percarbonate-containing dust removed from the offgas from a fluidized bed in which sodium percarbonate is prepared by buildup granulation from sodium carbonate and hydrogen peroxide.

In a further preferred embodiment, the process according to the invention uses sodium percarbonate-containing dust removed from the offgas from the fluidized bed of the process according to the invention. As well as sodium percarbonate, this sodium percarbonate-containing dust also contains sodium sulfate. The proportion of sodium percarbonate in the dust is preferably in the range from 50 to 80% by weight and the proportion of sodium sulfate in the range from 50 to 20% by weight. With this embodiment, it is possible to avoid losses of sodium sulfate when the coating layer is applied to the sodium percarbonate particles, and to use the applied sodium sulfate completely for the production of the coating.

In a likewise preferred embodiment, the process according to the invention uses sodium percarbonate-containing dust removed from a gas stream from a pneumatic delivery of sodium percarbonate particles. With this embodiment, it is especially possible to recycle the abraded coating material which arises in a pneumatic delivery of coated sodium percarbonate particles back into the process, and to use it again for coating.

In a further preferred embodiment, the process according to the invention uses two or more different sodium percarbonate-containing dusts which originate from different stages of a process for producing coated sodium percarbonate particles to produce the sodium sulfate-containing aqueous solution. With this embodiment, it is possible to recycle all dusts obtained in a process for producing coated sodium percarbonate particles completely back into the process, and to use them for coating.

In the process according to the invention, the sodium sulfate-containing aqueous solution is sprayed onto sodium percarbonate particles in a fluidized bed. During the spray application of the sodium sulfate-containing aqueous solution, the majority of the water present therein, especially more than 90% of the water present in the aqueous solution, is preferably already evaporated through supply of heat, such that only a small portion of the underlying material is dissolved again during the application of the coating layer and a firm coating layer forms already during the spray application. The spray application of the aqueous solution is effected preferably by the process described in EP-A 0 970 917, with which a dense coating layer can be achieved even with small amounts of coating layer material. The spray application is effected preferably with supply of a drying gas to the fluidized bed, such that a temperature in the range from 30 to 90° C., preferably 50 to 70° C., is established in the fluidized bed.

Sodium sulfate and sodium percarbonate-containing dust are preferably used in such amounts that the aqueous solution which is sprayed onto the sodium percarbonate particles contains sodium sulfate and sodium carbonate in a weight ratio in the range from 95:5 to 75:25. The spray application of solutions with this ratio of sodium sulfate and sodium carbonate affords coated sodium percarbonate particles which, compared to sodium percarbonate particles with a coating layer of sodium sulfate, have improved storage stability in detergent and cleaning composition formulations and simultaneously have good silo storability.

In a preferred embodiment, the aqueous solution prepared using sodium sulfate and sodium percarbonate-containing dust contains a total of not more than 25% by weight of dissolved salts. While the prior art teaches applying a coating layer by using highly concentrated solutions of the coating components in order to minimize the amount of water to be evaporated, it has been found that, surprisingly, sodium percarbonate particles with a coating layer which has been produced by spray application of an aqueous solution with not more than 25% by weight of dissolved salts have better storage stability in detergent and cleaning composition formulations than sodium percarbonate particles obtainable by spray application of an aqueous solution with a higher content of dissolved salts.

EXAMPLES

Production of Coated Sodium Percarbonate Particles

To produce the coated sodium percarbonate particles, sodium percarbonate particles which have been produced from aqueous hydrogen peroxide solution and aqueous sodium carbonate solution by fluidized bed buildup granulation by the process described in EP-B 0 716 640, and had a mean particle diameter $x_{50}$ of 0.70 mm and a fines fraction smaller than 0.2 mm of less than 2% by weight, were used. The coating layer was applied to these particles by the process described in paragraph [0021] of EP-B 0 863 842, by spray application of a 20% by weight aqueous solution of the coating materials in a fluidized bed at a fluidized bed temperature of 60° C. and simultaneous evaporation of water. In total, 4% by weight in each case of coating materials, calculated without water of crystallization, relative to the total amount of sodium percarbonate particles and coating materials used, were sprayed on.

The dust 1 used in examples 2, 3 and 4 to produce the coating material solutions was separated from the air discharged from a production plant for coating sodium percarbonate particles with sodium sulfate in a fluidized bed. The dust 2 used in examples 5, 6 and 7 was separated from the air discharged from a production plant for producing sodium percarbonate particles by fluidized bed buildup granulation. The composition of the two dusts is depicted in table 1.

In example 8, the solution of the coating materials was prepared by dissolving 20 parts by weight of sodium sulfate in 80 parts by weight of an aqueous solution which was obtained in a scrubber in which dust was separated from the air discharged from a production plant for coating sodium percarbonate particles with sodium sulfate in a fluidized bed and from the air discharged from a production plant for producing sodium percarbonate particles by fluidized bed buildup granulation. The solution from the scrubber contained a total of 6.1% by weight of dissolved solids.

In comparative example 9, the dust 2 was not dissolved together with sodium sulfate, and instead a solution of pure sodium sulfate was sprayed on and the dust was supplied directly in solid form to the fluidized bed.

TABLE 1

Composition of the sodium percarbonate-containing dusts used in % by weight

| Component | Dust 1 | Dust 2 |
|---|---|---|
| Sodium percarbonate | 71.2 | 89.8 |
| Sodium carbonate | 5.1 | 7.3 |
| Sodium bicarbonate | 1.3 | 2.1 |
| Sodium sulfate | 21.8 | 0.6 |
| Magnesium sulfate | 0.3 | 0.3 |
| Waterglass, calculated as $SiO_2$ | 0.2 | 0.3 |

Storage Stability in Detergents

To determine storage stability in detergents, 405 g of zeolite-containing IEC-A* BASE heavy-duty powder detergent (wfk-Testgewebe GmbH, Krefeld) were mixed with 15 g of TAED and 80 g of sodium percarbonate in a tumbling mixer for at least 10 min. The mixture was introduced into an E2 powder detergent box (dimensions 19×14×4.5 cm) with water-repellent impregnation, which was sealed with hot-melt adhesive. The powder detergent box was then stored in a climate-controlled cabinet at 35° C. and 80% relative humidity. After the powder detergent box had been cooled to room temperature outside the climate-controlled cabinet, the contents of the powder detergent box were divided into samples of 12 g each using a sample divider. The active oxygen content before and after storage was determined by permanganometry in a customary manner. The retention of the active oxygen content (Oa retention) in percent was determined from the active oxygen content before storage and the active oxygen content after 8 weeks of storage as a measure of the storage stability in detergents.

The test results compiled in table 2 show that the use of sodium percarbonate-containing dust to prepare the solution of the coating materials gives coated sodium percarbonate particles with an improved storage stability in detergents. This result was unforeseeable since it is known from WO 97/19890 examples B1 and VB5 that, when the sodium percarbonate particles with the coating layer composed of a mixture of sodium sulfate and sodium carbonate known from DE 2 417 572 were used for the tests, the storage stability achieved was no better than with a coating of pure sodium sulfate.

The test results also show that the addition of sodium percarbonate-containing dust directly into the coating without preceding dissolution of the dust, known from WO 2006/003155, gives sodium percarbonate particles with significantly poorer storage stability in detergents.

TABLE 2

Storage stability of coated sodium percarbonate particles in detergents

| Example | Composition of the coating layer in parts by weight | Storage stability [Oa retention in percent] |
|---|---|---|
| 1* | $Na_2SO_4$ 100 | 48 |
| 2 | $Na_2SO_4$/dust 1 95:5 | 55 |
| 3 | $Na_2SO_4$/dust 1 90:10 | 67 |
| 4 | $Na_2SO_4$/dust 1 85:15 | 72 |
| 5 | $Na_2SO_4$/dust 2 95:5 | 60 |
| 6 | $Na_2SO_4$/dust 2 90:10 | 70 |
| 7 | $Na_2SO_4$/dust 2 85:15 | 69 |
| 8 | $Na_2SO_4$/$Na_2CO_3$/$NaHCO_3$ 82:14:4 | 72 |
| 9* | $Na_2SO_4$/dust 2** 90:10 | 52 |

*not according to the invention
**addition of the dust in solid form

The invention claimed is:

1. A process for producing coated sodium percarbonate particles, comprising spraying a sodium sulfate-containing aqueous solution onto sodium percarbonate particles in a fluidized bed while simultaneously evaporating water, wherein:
   a) said sodium sulfate-containing aqueous solution is prepared by dissolving sodium sulfate and sodium percarbonate-containing dust; and
   b) said sodium sulfate-containing aqueous solution contains sodium sulfate and sodium carbonate in a weight ratio in the range of from 95:5 to 75:25.

2. The process of claim 1, wherein said sodium percarbonate-containing dust is separated from a gas stream in a scrubber to provide an aqueous solution and said solution is used to prepare the sodium sulfate-containing aqueous solution.

3. The process of claim 1, wherein said sodium percarbonate-containing dust is removed from an offgas from the fluidized bed.

4. The process of claim 1, wherein said sodium percarbonate-containing dust is removed from a gas stream from a pneumatic delivery of sodium percarbonate particles.

5. The process of claim 1, wherein said sodium percarbonate-containing dust is removed from an offgas from a fluidized bed, in which sodium percarbonate is prepared by buildup granulation from sodium carbonate and hydrogen peroxide.

6. The process of claim 1, wherein said sodium sulfate-containing aqueous solution is sprayed onto sodium percarbonate particles which are obtained by buildup granulation from sodium carbonate and hydrogen peroxide in a fluidized bed.

7. The process of claim 1, wherein said sodium sulfate-containing aqueous solution contains not more than 25% by weight of dissolved salts.

8. The process of claim 1, wherein said sodium percarbonate particles additionally comprise a known stabilizer of peroxygen compounds.

9. The process of claim 1, wherein the proportion of sodium percarbonate in said sodium percarbonate particles onto which said aqueous solution is sprayed is more than 80% by weight and the proportion of organic carbon compounds is less than 1% by weight.

10. The process of claim 1, wherein the proportion of sodium percarbonate in said sodium percarbonate particles onto which said aqueous solution is sprayed is more than 95% by weight and the proportion of organic carbon compounds is less than 0.1% by weight.

11. The process of claim 1, wherein said sodium percarbonate particles onto which said aqueous solution is sprayed include an alkali metal silicate, present at less than 2% by weight.

12. The process of claim 11, wherein said sodium percarbonate particles onto which said aqueous solution is sprayed further comprise a magnesium compound in an amount of 50 to 2000 ppm of $Mg^{2+}$.

13. The process of claim 12 wherein said sodium sulfate-containing aqueous solution contains not more than 25% by weight of dissolved salts.

14. The process of claim 13, wherein said sodium percarbonate-containing dust is separated from a gas stream in a scrubber to provide an aqueous solution and said solution is used to prepare the sodium sulfate-containing aqueous solution.

* * * * *